(12) United States Patent
Xu et al.

(10) Patent No.: US 7,364,601 B2
(45) Date of Patent: Apr. 29, 2008

(54) PRECLEANER ARRANGEMENT FOR USE IN AIR FILTRATION; METHOD; AND, AIR CLEANER USING SAME

(75) Inventors: Jian Xu, Maple Grove, MN (US); Steven Scott Gieseke, Richfield, MN (US); Marty A. Barris, Overijse (BE)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 11/796,792

(22) Filed: Apr. 30, 2007

(65) Prior Publication Data

US 2007/0234903 A1   Oct. 11, 2007

Related U.S. Application Data

(63) Continuation of application No. 10/569,235, filed as application No. PCT/US2004/031124 on Sep. 23, 2004, now abandoned.

(60) Provisional application No. 60/512,109, filed on Oct. 17, 2003.

(51) Int. Cl.
  *F02M 35/022* (2006.01)
  *B01D 45/12* (2006.01)

(52) U.S. Cl. .................. 55/320; 55/332; 55/337; 55/456; 55/457

(58) Field of Classification Search ............... 55/320, 55/321, 337, 449; 123/198 E; 95/268, 269
See application file for complete search history.

(56) References Cited

U.S. PATENT DOCUMENTS

| | | | |
|---|---|---|---|
| 3,581,477 A | 6/1971 | Bell et al. | |
| 3,590,560 A | 7/1971 | Pall et al. | |
| 3,670,480 A | 6/1972 | Peterson | |
| 3,678,664 A | 7/1972 | Rubinshtein et al. | |
| 3,713,280 A | 1/1973 | Keller et al. | |
| 3,740,932 A | 6/1973 | Borsheim | |
| 3,792,573 A | 2/1974 | Borsheim | |
| 3,813,854 A | 6/1974 | Hortman | |
| 3,907,529 A | 9/1975 | Borsheim | |
| 3,951,620 A | 4/1976 | Frischmuth, Jr. | |
| 3,960,734 A | 6/1976 | Zagorski | |
| 3,973,937 A | 8/1976 | Petersen | |
| 4,008,059 A | 2/1977 | Monson et al. | |
| 4,014,673 A | 3/1977 | Kinnison | |

(Continued)

FOREIGN PATENT DOCUMENTS

| GB | 237895 | * 11/1925 |
|---|---|---|
| GB | 752380 | * 7/1956 |

*Primary Examiner*—Duane Smith
*Assistant Examiner*—Sonji Turner
(74) *Attorney, Agent, or Firm*—Merchant & Gould P.C.

(57) ABSTRACT

A precleaner arrangement for use in separating a portion of entrained material in air from air entering an air cleaner, is provided. The precleaner arrangement includes a vane structure positioned to direct air into a circular or cyclonic pattern, to facilitate material separation. The vane structure includes one or more adjustable air deflection vanes. Each adjustable air deflection vane is constructed: to have a first position under no air flow or low air flow rate conditions; and, to deflect to import a more open, lower restriction, orientation under increased air flow rates. Preferred precleaner arrangement constructions, assemblies utilizing in the precleaner arrangement and methods are described.

13 Claims, 10 Drawing Sheets

U.S. PATENT DOCUMENTS

| | | |
|---|---|---|
| 4,050,913 A | 9/1977 | Roach |
| 4,127,396 A | 11/1978 | Tortorici et al. |
| 4,159,899 A | 7/1979 | Deschenes |
| 4,173,458 A | 11/1979 | Stiles |
| 4,197,102 A | 4/1980 | Decker |
| 4,198,217 A | 4/1980 | Erdmannsdorfer |
| 4,201,557 A | 5/1980 | Petersen |
| 4,248,613 A * | 2/1981 | Linhart ........................ 55/394 |
| 4,255,174 A | 3/1981 | Simpson |
| 4,373,940 A | 2/1983 | Petersen |
| 4,394,145 A | 7/1983 | Sundseth |
| 4,459,141 A | 7/1984 | Burrington et al. |
| RE33,085 E | 10/1989 | Petersen |
| 5,022,903 A | 6/1991 | Decker |
| 5,059,222 A * | 10/1991 | Smith .......................... 55/309 |
| 5,498,273 A | 3/1996 | Mann |
| 5,505,756 A | 4/1996 | Decker |
| 5,656,050 A * | 8/1997 | Moredock ................... 55/394 |
| 5,899,196 A * | 5/1999 | Chite .......................... 123/556 |
| 5,947,081 A * | 9/1999 | Kim .......................... 123/306 |
| 6,174,339 B1 | 1/2001 | Varady |
| 6,264,712 B1 * | 7/2001 | Decker ......................... 55/456 |
| 6,280,493 B1 | 8/2001 | Eubank |
| 6,361,574 B1 | 3/2002 | Decker |
| 6,395,048 B1 * | 5/2002 | Yoder et al. ............... 55/385.3 |
| 7,267,098 B1 * | 9/2007 | Tasanont .................... 123/306 |

* cited by examiner

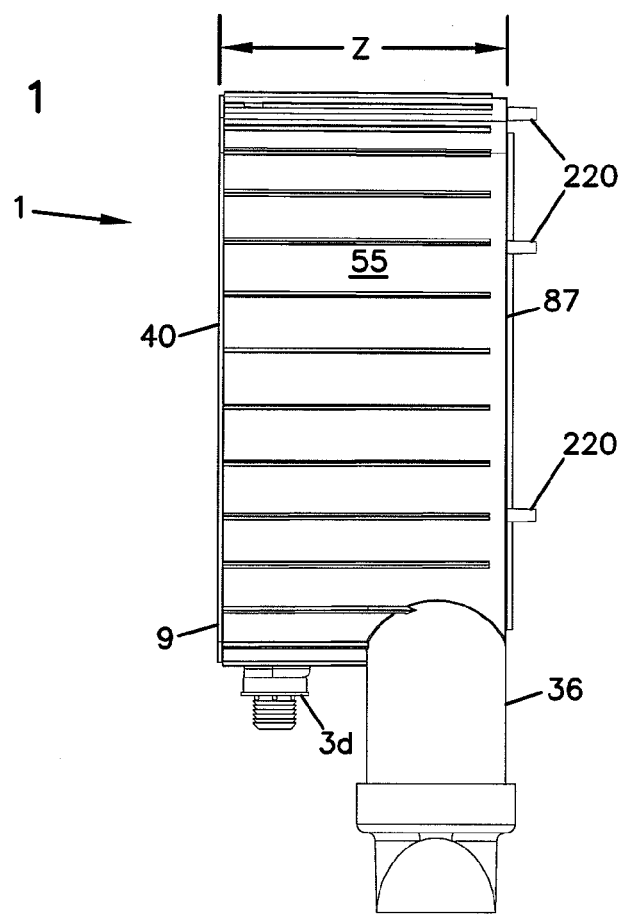
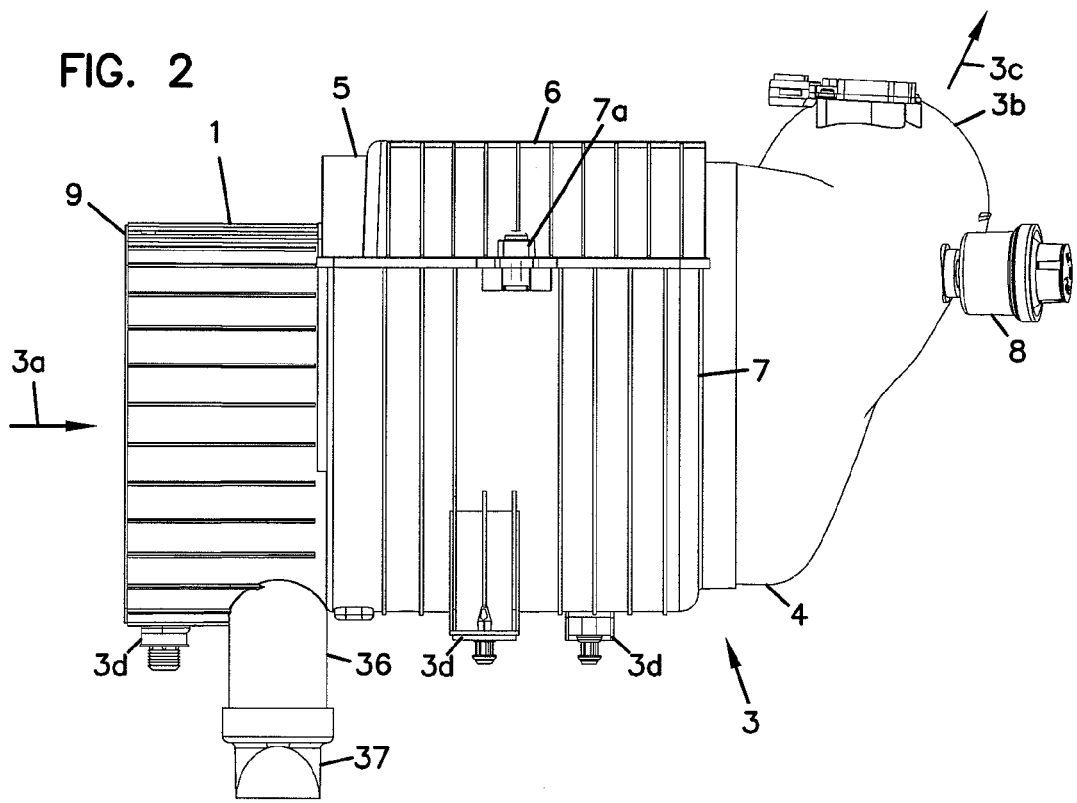

PRECLEANER ARRANGEMENT FOR USE IN AIR FILTRATION; METHOD; AND, AIR CLEANER USING SAME

This application is a continuation of application Ser. No. 10/569,235, filed Dec. 4, 2006 now abandoned. Application Ser. No. 10/569,235 is a 371 of PCT/US04/31124 filed Sep. 23, 2004. PCT/US04/31124 claims priority to provisional patent application 60/512,109 filed Oct. 17, 2003. Each of applications Ser. Nos. 10/569,235; PCT/US04/31124; and 60/512,109 is incorporated in its entirety by reference herein.

FIELD OF THE INVENTION

The present disclosure relates to air filtration. A typical application is in air cleaner arrangements to be used for air filtration, for example filtration of intake air for internal combustion engines. The invention particularly concerns advantageous features of precleaner assemblies for air cleaner arrangements, which provide for a precleaning of dust or other material from the air, prior to the air being passed through filter media within an air cleaner.

BACKGROUND

Gas streams often carry material entrained (for example dust or moisture) therein. In many instances, it is desirable to remove some or all of the entrained material from a gas flow stream. For example, air intake streams to engines for motorized vehicles, construction equipment or for power generation equipment, often include moisture or particulate material therein. The particulate material, should it reach the internal workings of the various mechanisms involved, can cause substantial damage thereto. The moisture can also damage equipment. It is therefore preferred, for such systems, to reduce the level of particulate material and moisture in the gas flow upstream of the engine or other equipment involved. A variety of air filter arrangements have been developed for such removal. In general, however, continued improvements are sought.

SUMMARY

According to the present disclosure an adjustable air deflector vane structure or arrangement is provided, for use in precleaners for air cleaner assemblies. Typical precleaners would be used with air cleaner assemblies configured, for example, to filter engine intake air for vehicles, construction equipment, power generation equipment or similar equipment.

The adjustable air deflection vane structure or arrangement comprises providing portions of at least one, and typically more than one, air deflection vane in a form which utilizes a flexible material to form at least a portion of the vane surface, with each vane being mounted so that the flexible portion can bend or deflect (deform) in a downstream direction with selected increases in air flow, during use. The flexible material is preferably chosen to have an appropriate memory, so that as the air flow rate reduces, the vane tends to return to its normal, non-deflected, position, configuration or orientation.

Such vane structures can be utilized to configure and construct preferred precleaner arrangements that: provide for a desirable level of efficiency of operation at relatively low air flow rates; and, provide for a preferred opening to reduce restriction increase, under higher air flow conditions.

Examples of dimensions, configurations and materials are provided, to indicate various ways in which the principles can be implemented. Also according to the present disclosure, methods of assembly and use are provided. In addition, an example of an air cleaner assembly, utilizing such a precleaner, is provided.

BRIEF DESCRIPTION OF THE DRAWINGS

FIG. 1 is an enlarged side elevational view of a precleaner arrangement according to the present disclosure.

FIG. 2 is a side view of an air cleaner assembly having a precleaner arrangement according to FIG. 1 mounted thereon.

DETAILED DESCRIPTION

I. General Background

Figure 3:
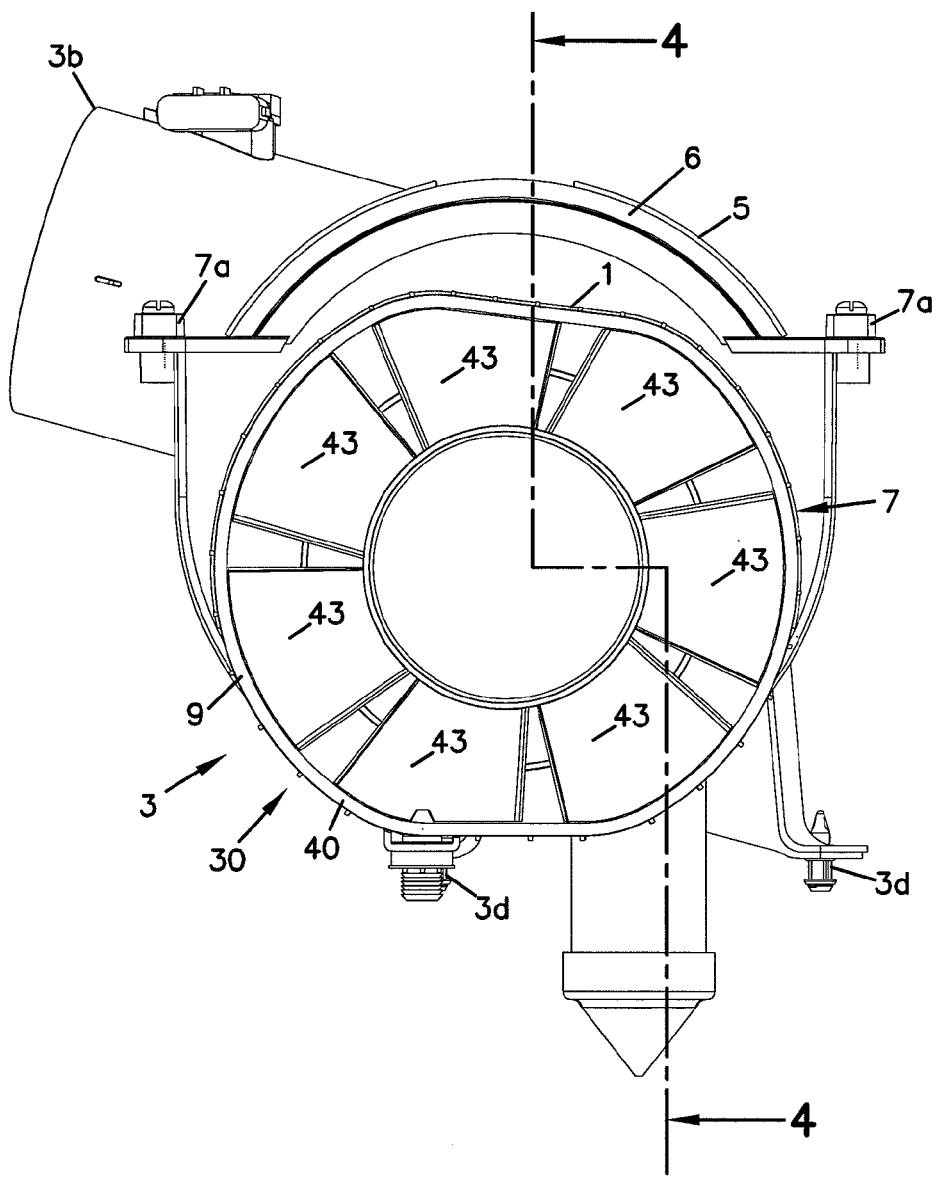
FIG. 3 is an end view of the arrangement depicted in FIG. 2, FIG. 3 being a view toward an inlet end of the precleaner arrangement.

The reference numeral 1, FIG. 1, depicts a precleaner arrangement according to the present disclosure. In FIG. 2, the precleaner arrangement 1 is depicted comprising a component of an overall air cleaner assembly 3. The assembly 3 also includes main air cleaner 4, as discussed below.

Referring to FIG. 3, the air cleaner assembly 3 is of the type typically used for filtering engine intake air for internal combustion engines. For example, the air cleaner assembly 3 can comprise an air cleaner for use with a vehicles such as trucks or tractors. As an example, the precleaner could be used with class 2-class 4 trucks, such as pickup trucks, SUVs, tow trucks, and delivery trucks, although many other applications are possible.

In general, such air cleaners include a housing 5 having, positioned therein, a serviceable air filter or air filter element, not shown in FIG. 2. By the term "serviceable" in this context, it is meant that the air filter element can be removed, to be refurbished or to be replaced. In general, to accommodate this, the housing 5 is provided with an access panel or cover, in this instance indicated at 6, which can be removed from a remainder 7 of the housing 5, for access to the interior, by loosening of bolts 7a (one bolt not being viewable in FIG. 1, see FIG. 3).

In typical operation, air enters air cleaner 3 by entrance into precleaner 1 in the direction of arrow 3a. Air exits through outlet 3b in the direction of arrow 3c, to be directed to an engine intake manifold, or other equipment structure.

The air cleaner assembly 3 can be mounted on the equipment, by posts 3d.

Typically, serviceable air filter elements comprise media through which the air to be filtered is passed, in use. The media captures or traps a portion of particulate contaminant, such as dust or ash, carried within the air. The service interval is generally related to the time of operation it takes for the filter element to become sufficiently loaded with dust or other material such that the restriction across the air filter element, and thus across the air cleaner, is undesirably increased. That is, as material is loaded onto the filter element during the filtering operation, restriction across the air filter increases. Generally, the service interval is recommended by the engine manufacturer or vehicle manufacturer to occur at a point in time prior to an undesirable restriction having been reached. This service interval can be defined, for example, by hours of operation or miles of operation for the equipment involved.

The particular air cleaner 3 depicted in FIG. 2, includes thereon a restriction indicator 8. The restriction indicator 8 can be configured to indicate when the restriction across the air filter has reached a point that service is required or is recommended.

Some air cleaners are provided with precleaners. A precleaner is an arrangement that allows for separation of a portion of dust or other material entrained within the air to be cleaned, prior to the air passing through the serviceable air filter element. Precleaners generally operate by imparting a circular, cyclonic or coiled momentum to the incoming air, and the entrained material, as opposed to passage of the air through a filter media. This circular (cyclonic or coiled) momentum causes a deposition of a portion of the entrained material from the air flow, before the air is transferred into a region of the air cleaner assembly that includes the serviceable filter element. Precleaners of this type are described for example in U.S. Pat. Nos. 5,545,241; 6,039,778; and 5,401,285, all three of the identified patents being incorporated herein by reference. For the types of systems described in the U.S. Pat. Nos. 5,454,241 and 6,039,778 patents, the precleaner comprises an arrangement which drives inlet air to the air cleaner into a cyclonic flow around the serviceable filter element, combined with a drop tube for ejection of the material separated by the precleaner from the system.

For the type of air cleaner described in U.S. Pat. No. 5,401,285, the precleaner comprises a panel of individual dust separator tubes, each of which provides for some separation prior to air entry into the main body of the air cleaner which includes the serviceable element(s). A variety of separator tubes of this type are shown, for example, in U.S. Pat. Nos. 4,008,059; 4,050,913; 4,289,611; 3,448,563; 3,713,280; 4,985,058; 4,976,748; 5,403,367; and 5,480,464; all nine of which are incorporated herein by reference.

Another example of a precleaner including a plurality of separator tubes is provided in PCT application number PCT/US03/10258 filed Jul. 18, 2003. In this example, the precleaner arrangement, including separator tubes, a down flow tube and an evacuator valve, is positioned upstream of a main air cleaner which includes therein a serviceable filter element comprising z-filter media.

Precleaners generally provide for some restriction to air flow. A reason for this is that ramps or vanes (sometimes called blades or fins) which divert the air into a circular (cyclonic or coiled) pattern generally need to be positioned in extension across the direction of inlet air flow, to impart the desired circular (cyclonic or coiled) momentum to the flow. This causes restriction.

With some prior art types of precleaners that use a separate precleaner with a vane or blade arrangement for separation, prior to the air being directed into or around the serviceable element, the vane or blade systems used to impart the circular momentum, have a vane axial length which is greater than a corresponding vane outer size. In this context the term "vane axial length" in this context is meant to refer to the length of distance, axially, i.e., in the axial direction of air flow over which the blades extend. An example of vane axial length will be described for precleaner 1, and drawings below.

In the context of the definition in the previous paragraph the term "vane outer size" is meant to refer to a length corresponding to a smallest distance between opposite outer edges of oppositely directed portions of the vane structure. An example of this will also be described in connection with precleaner 1, below.

Examples of precleaners with vane arrangements in which the vane axial length is greater than the vane outer size, are provided in U.S. Pat. Nos. 5,480,464 and 4,976,748, each of which is incorporated herein by reference.

The volume of the space needed for the air cleaner, in a vehicle, is in part a function of the specification for operation of the engine, i.e., the amount of air flow expected for proper engine operation and the length of service interval required, for the serviceable filter element. Larger serviceable filter elements will occlude slower. However, larger serviceable filter elements require more space. Especially with vehicles in which the air cleaner is to be contained under the hood or within an engine compartment, available space may be severely limited. This leads to limitation on the size and shape of space available for containing the air cleaner.

It should be apparent that maximizing the size of the serviceable filter element in many instances is desirable, to provide for increase in filter life with a reduction in restriction. However, of course, other componentry of the air cleaner must be managed. Ultimately, the amount of space available to accommodate vane axial length and outer size in a precleaner, may be somewhat limited.

Another issue of concern to the vehicle manufacturers and engine manufacturers, is definition of: (a) restriction under certain operating conditions, and, (b) preferred precleaner efficiency under certain operating conditions. Typically, these definitions are provided with respect to some identified operating flow of air through the air cleaner. In some instances, for example, an engine or vehicle manufacturer may define the desired efficiency for a precleaner when the air flow demand is at some desired rate, for example, 350 cfm. (cubic feet per minute), and couple it with another specification for a defined total restriction not to be surpassed when the engine is operated at a higher air flow rate, for example, 900 cfm. Precleaner efficiency and restriction for dust can be defined, for example, according to SAE Standard J726C.

II. Air Cleaner Assembly 3, Generally

Attention is now directed to FIG. 3. FIG. 3 is an end view of the air cleaner assembly 3 depicted in FIG. 2. In FIG. 3, the view point is toward an air inlet end for the precleaner 1.

Figure 4:
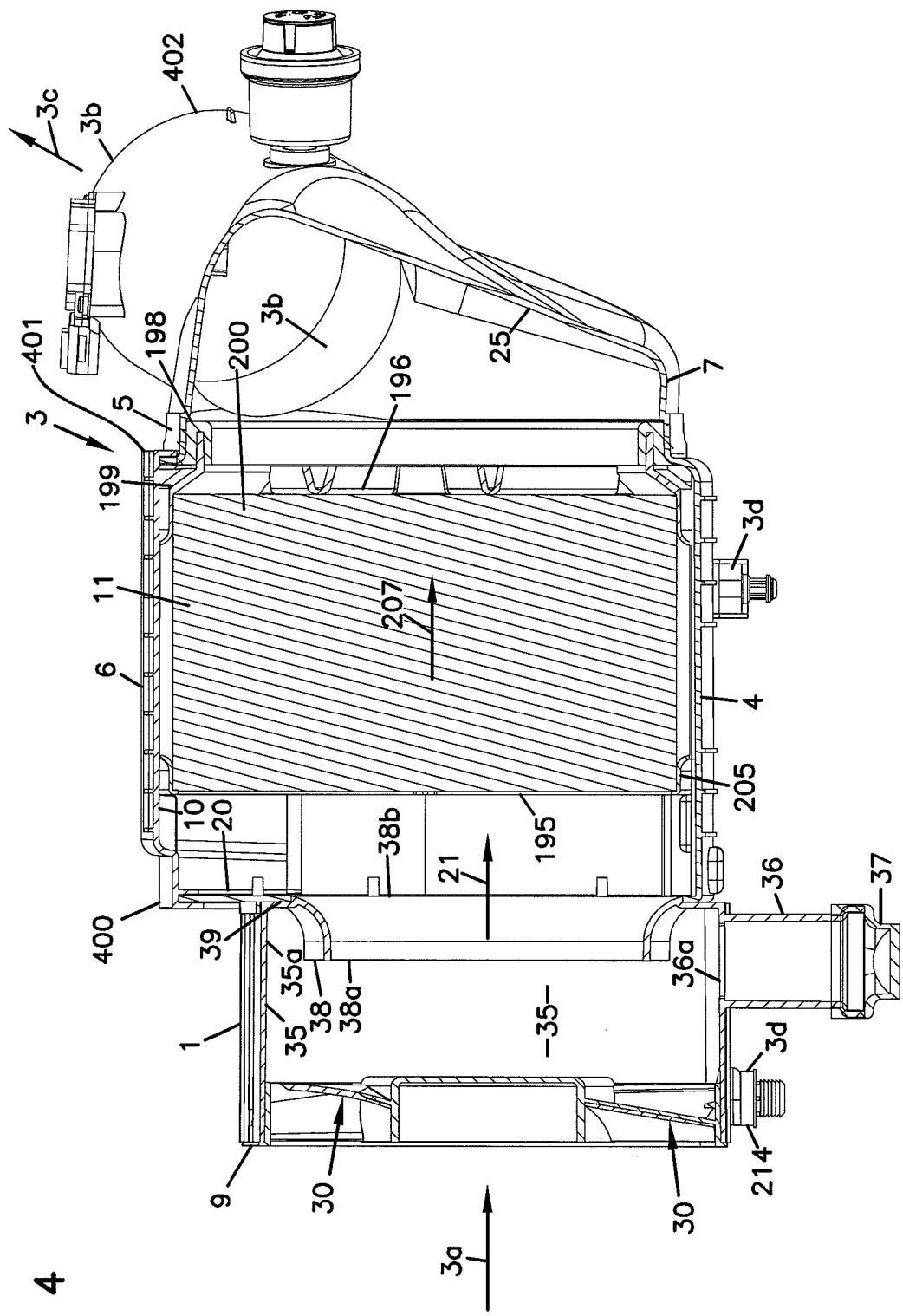
FIG. 4 is a cross-sectional view of the air cleaner assembly, taken generally along line 4-4, FIG. 3.

FIG. 4 is a cross-sectional view of the air cleaner assembly 3, taken along line 4-4, FIG. 3.

Referring to FIG. 4., the air cleaner assembly 3 comprises precleaner 1 and a main air cleaner 4. Main air cleaner 4 comprises housing 5 having an access cover 6, which is selectively removable from a remainder 7 of the housing 5. The housing 5 can be mounted in position (in equipment for use) by post(s) 3d.

The housing 5 defines an interior 10, in which is operably placed a removable and replaceable, i.e., serviceable, primary filter element 11.

In operation, air enters the air cleaner assembly 3 by flow in the direction of arrow 3a into precleaner 1. The air then passes into the main air cleaner 4 through inlet end 20, in the direction of arrow 21. The air then passes through the main filter element 11 and outwardly through outlet 3b. The region 25 defines a clean air plenum, into which air cannot pass until it has been filtered.

In some applications, a secondary or safety filter element may be positioned between the primary filter element 11 and the clean air plenum 25. Examples of secondary or safety elements of this type, for such applications, are described for example in U.S. Pat. Nos. 6,221,122 and 6,179,890, incorporated herein by reference. Of course, the housing 5 would need to be configured to accommodate such a secondary or safety filter element.

Referring again to FIG. 4, within the precleaner 1, vane structure 30 imparts circular, (i.e., coiled or cyclonic) momentum to the air flow. This cyclonic momentum will cause at least a portion of material entrained within the air, to be directed against inner surface 35 of the precleaner 1. A portion of this dust, moisture, or other material will eventually be ejected through slot 36a into down tube 36 and evacuation valve 37. Down tubes and evacuation valves similar in construction to down tube 36 and evacuation valve 37 are known and are shown, for example, in U.S. Pat. Nos. 5,545,241 and 6,039,778 and PCT application PCT/US03/10258 filed Jul. 18, 2003; all three of these references being incorporated herein by reference.

To facilitate separation of entrained material from the air, air cleaner 3 is provided with an exit skirt 38 at a junction 39 between the precleaner 1 and the main air cleaner 4. In this instance, the skirt 38 comprises a portion of the precleaner 1; however it could be constructed as a portion of the main air cleaner 4. The skirt 38 has an inlet end 38a and an exit end 38b; the inlet end 38a having a smaller cross-sectional size than the interior defined by wall 35 in the same region. This defines a space 35a between the skirt 38 and wall 35, in which a portion of the entrained material will be driven, during this particular cyclonic flow. The relatively narrow inlet 38a ensures that air passing in the direction of arrow 21 will be reduced in amount of entrained material, by comparison to air entering the precleaner 1 in the direction of arrow 3a.

In some applications, skirt 38 will define a circular opening 38a, even though wall 35 may define a non-circular outer wall; however, skirt 38 is not required to define a circular opening 38a. Typically skirt 38a will define a cross-sectional opening having an area no more than 85%, and typically no more than 70% of an area corresponding to a cross-sectional area defined by inner wall 35. Preferably skirt 38 will extend into precleaner 1, and along wall 35, a distance of at least 0.5 inch, typically at least 0.75 inch.

Figure 6:
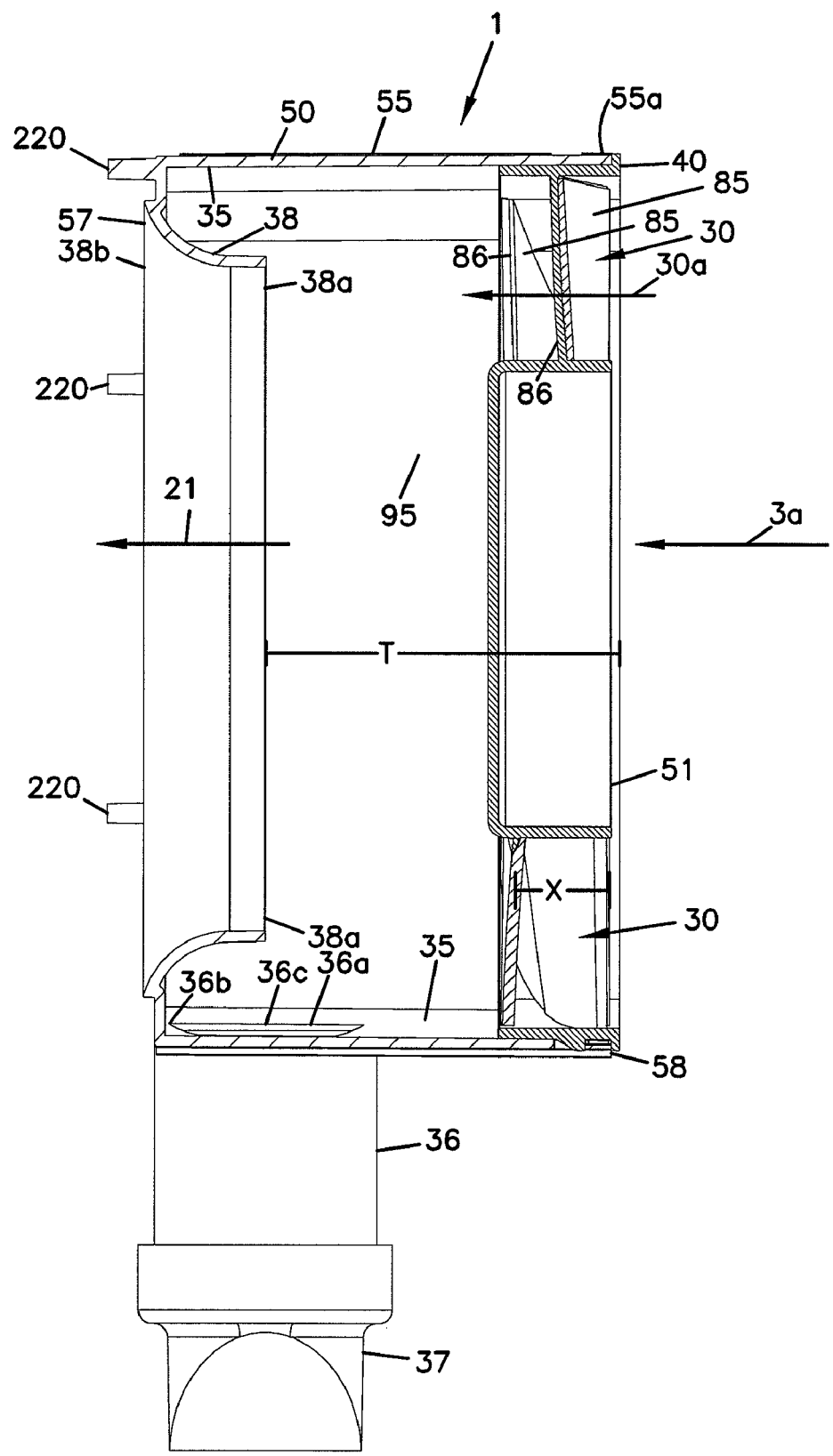
FIG. 6 is an enlarged cross-sectional view taken along line 6-6, FIG. 5.

Referring to FIG. 6, the most inward projection of skirt 38a is viewed extending about one-half of the extension across slot 36a. Typically and preferably, slot 36a will extend from edge 36b no further than the edge of skirt 38a.

Thus, the slot 36a depicted in FIG. 6 is longer than preferred. Most preferably the slot would extend only from point 36b to about point 36c.

Attention is now directed to FIG. 3, in which the vane structure 30 is generally shown at inlet end 40 of precleaner 1 (corresponding to inlet end 9 of air cleaner assembly 3). The vane structure 30 generally comprises one or more individual air deflection vanes 43. The particular number of air deflection vanes in any given precleaner, is a matter of choice based upon desired operation. It is anticipated that, typically, preferred precleaners according to the present disclosure for use with engines rated for operation at about 150 cfm to 1500 cfm (typically 300 cfm to 900 cfm), will include at least three vanes 43, typically at least five vanes 43, and usually a number of vanes within the range of three to fifteen (usually five to ten), inclusive. The particular example shown, includes seven (7) vanes 43.

Herein, the vanes 43 will be sometimes referenced as air deflection vanes, since their intended operation is to deflect incoming air in the direction of arrow 3a, FIG. 4, into a circular (cyclonic or coiled) pattern within the precleaner 1. For the particular arrangement depicted, FIG. 3, the vanes 43 are positioned to direct the air into a counter-clockwise flow pattern viewed from the perspective of FIG. 3. Of course an opposite flow pattern could be accommodated.

A variety of different specific configurations can be used for the air deflection blades or vanes 43. Typically each vane will extend at an angle relative to a plane perpendicular (or orthogonal) to the direction of air flow into the precleaner. There is no requirement that the vanes be perfectly flat, and indeed as described below, preferred blades or air deflection vanes 43 may have some curvature to them.

Figure 9:
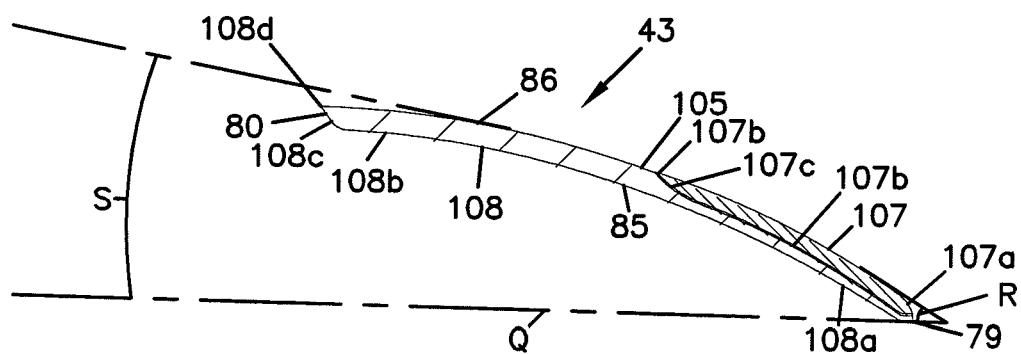
FIG. 9 is an enlarged cross-sectional view of a vane component of the precleaner assembly, taken along lines 9-9, FIGS. 5 and 11.

Referring to FIG. 9, discussed in detail below, cross-section of the vanes 43 is depicted. The angle of the vane, relative to a plane Q perpendicular to air inlet flow, is different at the inlet edge 79 than at the exit edge 80. At the inlet edge 79, this angle would be greater than at the exit edge 80, for typical curved vanes. At the inlet edge 79, the angle, represented at approximately by angle R, is typically within the range of 25° to 45°. At exit end 9, the angle, represented by angle S, is typically the range of 5° to 15°.

It is noted that the precleaner portion of arrangements such as described in U.S. Pat. Nos. 5,545,241 and 6,039,778 mentioned above, is located such that the ramp arrangement that causes the air to adopt a cyclonic or swirl pattern, actually surrounds a portion of the replaceable (serviceable) filter element, and is included within the same compartment that contains the serviceable filter element, spaced from the element by a shield. The type of precleaner 1 that is described in connection with the figures of the present disclosure, is positioned such that the swirl arrangement does not surround the serviceable filter element, and indeed such that separation occurs before the air even enters the region of the air cleaner 3 in which the serviceable filter cartridge 11 is located.

It is also noted, referring to FIG. 3, that for the precleaner 1 depicted, arrangement is provided in which all of the vanes 43 are positioned to circumscribe a single circular hub. Although the principles described herein could be applied in other arrangements, they are particularly well adapted for such a configuration. In many prior art precleaners, for example one such as shown in U.S. Pat. No. 5,403,367 at FIG. 3, a plurality of separators and thus a plurality of center hubs, each of which has a vane structure surrounding it, are provided.

III. An Example Precleaner Arrangement 1

Figure 5:
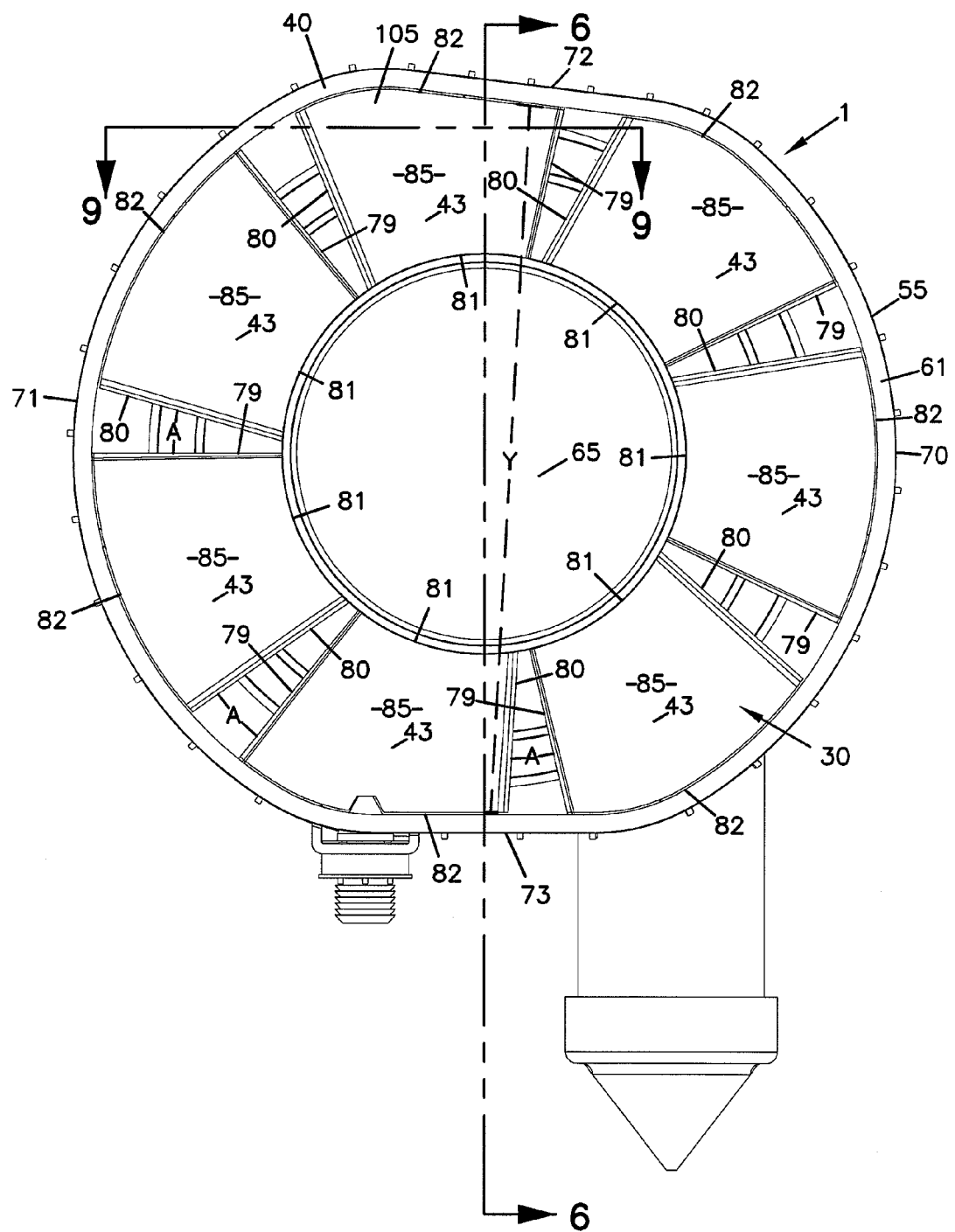
FIG. 5 is an enlarged end view of the precleaner arrangement of FIG. 1, FIG. 5 being viewed toward the air inlet end.
Figure 8:
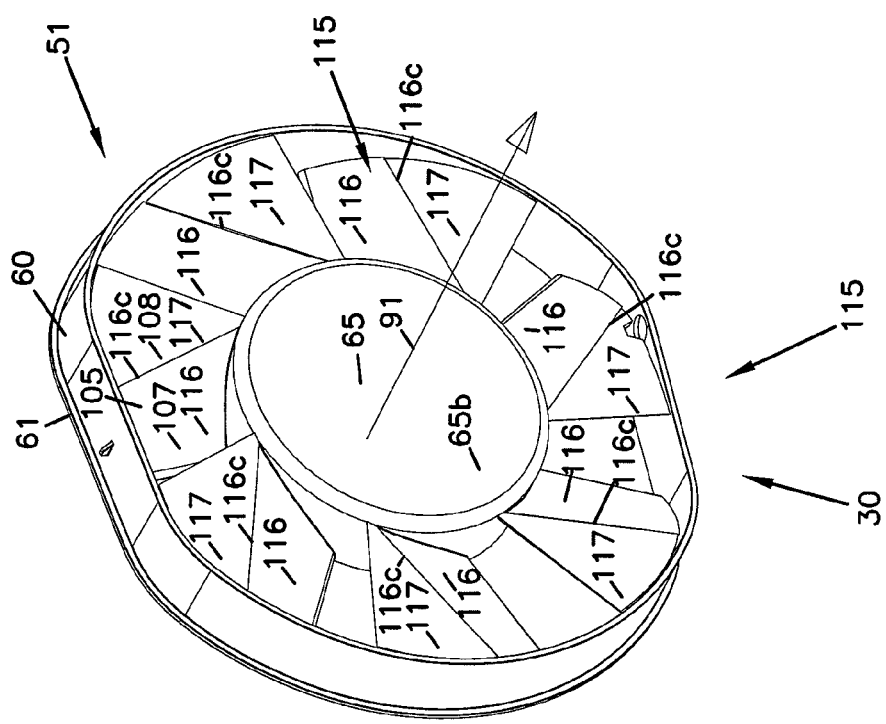
FIG. 8 is an inside perspective view of the component depicted in FIG. 7.
Figure 7:
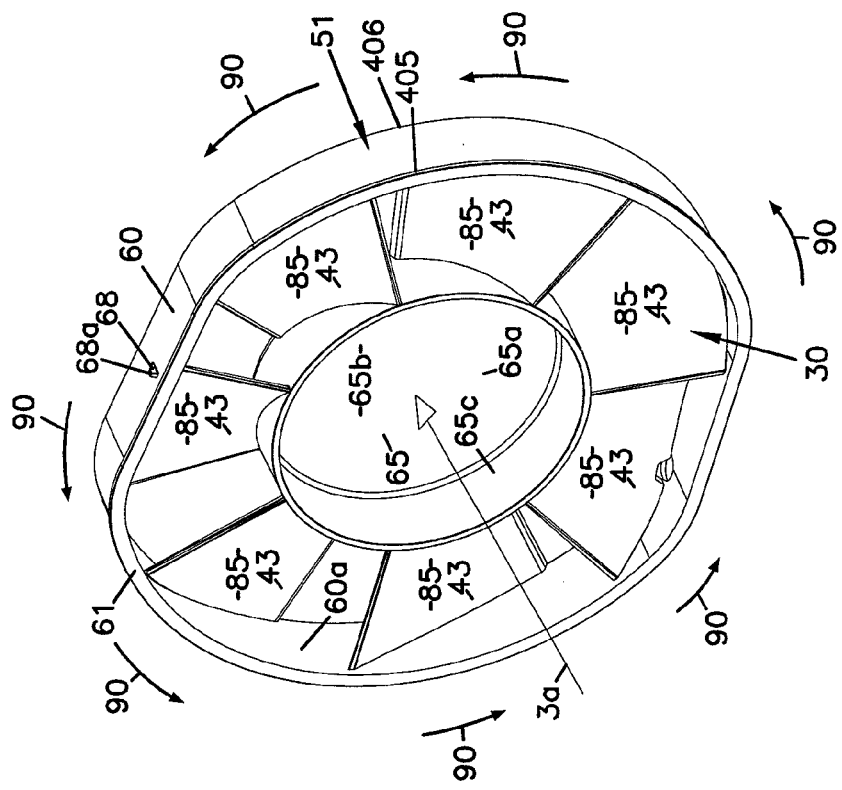
FIG. 7 is an outside perspective view of a component of the precleaner depicted in FIG. 1.

Attention is now directed to FIGS. 1, 5, 6, 7 and 8. FIG. 1, is a side elevational view of precleaner 1. In FIG. 5, an end view of precleaner arrangement 1 is depicted. FIG. 6 comprises a cross-sectional view of the precleaner arrangement 1 taken generally along line 6-6, FIG. 5. FIGS. 7 and 8 are opposite side perspective views of a component of the precleaner 1. Herein, FIG. 7 will sometimes be referred to as a "outside," or "upstream side" view of a vane structure portion of a precleaner 1, according to the present disclosure. This is because the view point of FIG. 7 is toward an outside surface of the vane structure, and toward a surface toward which air directed into the precleaner 1 flows.

The view point of FIG. 8, on the other hand, is sometimes referred to as an "inside" or "downstream side" view of the vane structure of precleaner 1, since it is directed toward a portion which is typically inside an air cleaner in use, and which is a side from which the air exits the main structure arrangement, in use.

Referring to FIG. 6, the precleaner arrangement 1 generally comprises an outer housing portion 50 having vane structure 30 positioned therein. The outer housing portion 50 generally comprises outer perimeter wall 55 defining inlet end 40 and outlet end 57. The outlet end 57 includes, positioned thereon, precleaner outlet skirt 38.

Also included in the outer housing portion 50 is down tube 36, with evacuation valve 37 positioned thereon.

For the particular preferred precleaner arrangement 1 depicted, the vane structure 30 comprises a separately formed vane assembly or component 51 which is inserted within an end 58 of outer housing part 50, during assembly, to form precleaner 1. The vane assembly 51 is depicted in FIGS. 7 and 8.

Referring to FIG. 7, the vane assembly 51 comprises: outer sidewall or rim 60, mounting flange 61, vane structure 30 comprising air deflection vanes 43; and, center hub 65. The air deflection vanes 43 are mounted to extend from the center hub 65 toward an inside surface 60a of outer rim 60.

Typically, the center hub 65 is impervious to passage of air therethrough. Vane structure 30, however, comprises a plurality of spaced vanes 43 that are spaced and configured to allow for air flow path between them.

The outer perimeter of the rim 60 is shaped or configured to match an inside surface of the wall 55 of the outer wall housing part 50, FIG. 6 to form inlet end 40. The mounting flange 61 is configured to project radially outwardly from side wall 60 sufficiently, so that it is positioned to engage wall 55 at an end 55a, FIG. 6, when a remainder of the rim 60 is projected internally of outer perimeter wall 55, during insertion of vane structure 30 into the outer housing part 50, to assemble precleaner 1.

Referring to FIG. 7, the vane assembly 51, for the preferred embodiment shown, includes (mounted projecting outwardly from rim 60), an interference tab 68. For the particular arrangement shown, only a single tab 68 is viewable. However, there would typically be two, oppositely directed, tabs 68 used. Each tab 68 is configured with a forward directing cam surface 68a, to facilitate snap-fit into a slot (not viewable) in wall 55 and to inhibit disassembly.

Referring to FIG. 5, the particular precleaner 1 depicted does not have a perfectly circular outer perimeter. Rather, it comprises two curved sections 70, 71 each connected to two, opposite, straight sections 72, 73. For the particular arrangement shown, the two straight sections 72, 73 do not extend parallel to one another; and, section 71 has larger radius of curvature than section 70.

The specific outer perimeter configuration for the precleaner assembly 1 is a matter of choice, within operating limits, for a given application. It will typically be selected, based upon the available space for installation of the precleaner assembly 3 and the size needed for adequate air flow. Thus, for example, the precleaner (and thus the outer perimeter) can be circular; it can have the configuration of two curved sections of the same relative curvature radius, attached by two parallel straight sections; it can have an arrangement analogous to that shown in FIG. 5; or it can have another shape. The selection, again, is a matter of choice, within operating limits, depending on the circumstances.

For the particular vane assembly depicted, the center hub 65, FIG. 5, is generally circular. Alternate shapes are possible.

For the particular embodiment depicted in FIGS. 7 and 8, the center hub 65 generally comprises a cup 65a, having a base 65b and a circular side wall 65c, FIG. 7.

Referring to FIG. 5, each one of the vanes 43 can be characterized as having an outer perimeter shape defined by four segments comprising: lead edge 79, tail edge 80, inner edge 81 and outer edge 82. There is no requirement that the outer perimeter of each one of the vanes 43 be identical to all of the others. Indeed, for the particular embodiment depicted, they are not. However typically in each case, each vane includes a lead or upstream edge 79, a tail or downstream edge 80, a radially inner edge 81, and a radially outer edge 82.

Again, for FIG. 5, the view point for the viewer is toward the inlet end 40 of the precleaner 1. The lead edge 79 is the edge of each vane 43, closest to the viewer, from the view point of FIG. 5, i.e., lead edge 79 is the edge of the vane 43 closest to inlet end 40. The lead edge 79 can be characterized as the upstream edge, with respect to normal air flow in use. The tail edge 80 of each vane 43, is the edge furthest from the viewer for the view point of FIG. 5, i.e., edge 80 is further from end 40 than edge 79. Edge 80 can also be characterized as the downstream edge.

The radially inner edge 81 of each vane is the edge adjacent center piece 65. The radially outer edge 82 for each vane is the opposite edge and is adjacent side wall 60.

Hereinabove, reference was made to the vane "axial length" of a vane system in a precleaner. In the example of precleaner 30, the axial length would be the projected distance; i.e., distance projected in a plane or in the direction of arrow 30a, FIG. 6, between the lead edge 79 and the tail edge 80, of the vanes 43. The axial length is approximated in FIG. 6, by dimension X.

Also, above, reference was made to the term "vane outer size." Referring to FIG. 5, the vane outer size is generally the smallest or shortest distance between the outer edges 82 of two oppositely directed deflector vanes 43. In FIG. 5, the vane outer size is approximated by dimension Y.

Of course if the vanes were identical and configured in a circular pattern, the vane outer size would simply be a diameter of the circular vane outer perimeter. With an obround configuration such as that shown in FIG. 5, the vane perimeter size would typically be measured as the shortest distance between opposite outside edges of oppositely directed vanes 43. If no two vanes 43 are precisely oppositely directed, an approximation will suffice.

In general, in preferred precleaners according to the present disclosure, as indicated above, the vane axial length X will be less than the vane outer size Y. Typically and preferably the vane axial length X will be no greater than 0.7 times the vane outer size. In an example such as that described, the axial length is typically less than 0.5, and usually less than 0.3, times, the vane outer size.

Indeed, as is apparent from a comparison of FIGS. 1, 5 and 6 the total precleaner axial length Z, FIG. 1, is less than the vane outer size Y, FIG. 5. It is an advantage of constructions according to the present disclosure, that such relative dimensions can be accommodated. Indeed in typical applications, the dimension Z, i.e., axial length of the precleaner, will be less than 0.8 times Y, typically less than 0.6 times the vane outer size Y. In this context, the precleaner axial length Z is the distance between dirty inlet 40 and clean air exit 38b ends of the precleaner structure, disregarding the outlet skirt 38.

Referring to FIG. 6, a dimension of interest is dimension T which reflects the distance between the entry to the precleaner 40, and the innermost extension of skirt 38a, i.e. the exit point from inner region 95 of precleaner 1, of clean air in the direction of arrow 21. In general, the blade axial dimension X is less than dimension T, often it is less than 0.6 times T, typically less than 0.5 times T.

To summarize, the principles described herein for preferred precleaner configurations, can be implemented in spaces that are of relatively short length (axial), with still achieving accomplishment of preferred operation.

In general, each air deflection vane 43 has first and second opposite surfaces 85, 86. Herein surface 85 will be considered to be the surface directed toward the inlet end 40 of the precleaner arrangement 1, FIG. 5, thus surface 85 faces the viewer, from the view point of FIG. 5. Surface 86, will be considered to be the opposite surface from surface 85, i.e., the surface directed toward the outlet end 87, FIG. 1, of the precleaner 1.

Alternately stated, surface 85 is an outside or upstream surface, with respect to air flow into precleaner 1, i.e., into vane assembly 30. Surface 86, FIG. 6, is an opposite, inside or downstream, surface, for each vane 43. Surface 85 is an impact surface for air entering the precleaner 1, in the direction of arrow 39, to be diverted into a circular, cyclonic or coiled air flow.

For the particular arrangement shown, FIG. 7, upstream surface 85 of each vane 43 is somewhat concave or scooped shaped. The overall radius of curvature for each can be within the range of about five to twelve inches, although alternatives are possible. Also, in the particular embodiment shown, opposite surface 86 of each vane 43 has an approximately opposite convex shape.

The term "concave" or "scooped shaped" in the previous paragraph, in connection with surface 85, is not meant to refer to any specific curvature, circular or otherwise, except to indicate that surface 85 tends to bend toward the upstream direction, in extension from upstream edge 79 to downstream edge 80, for each vane 43. The particular configuration is a matter of choice, for desired operating affects of the vanes 43 in causing the swirling action and restriction desired. For any given air cleaner for any conditions, it can be designed using modeling software such as FLUENT software available from Fluent Corp., Boston, Mass.

Referring to FIG. 7, as air flow occurs in the direction of arrow 3a, it will encounter the air deflection vanes 43. The vanes will cause the air to begin to swirl in the direction of arrows 90. Again, the vanes 43 are configured, so that this flow will generally be counter clockwise when the vane assembly 51 is viewed from the view point of FIG. 7. However, an opposite orientation is possible.

Because the lead edge 79 of each vane is positioned upstream of the next adjacent tail edge 90 of a next adjacent vane, the swirling motion 90 will allow the air to enter region 95, FIG. 6, of the precleaner arrangement 1, with a circular or cyclonic momentum. This will cause centrifugal separation of at least a portion of selected entrained material, with eventual ejection through down tube 36. The smaller diameter of air cleaner outlet skirt 38, FIG. 6, at the precleaner outlet 57, relative to side wall section 55, and the extension of skirt 38 inwardly to housing 50, spaced therefrom to form space 35a, helps ensure that the separated material does not re-entrain to an undesirable extent as the air exits the precleaner, FIG. 6, in the direction of arrow 21.

Referring to FIG. 5, adjacent vanes 43, for the embodiment shown, do not overlap. Generally lead, upstream, edge 79 of each vane is spaced from a next adjacent tail, downstream, edge 80 of a next adjacent vane 43, by a space corresponding to a projection angle A of at least about 17°, typically at least 20°, usually within the range of 20° to 30°, and typically not more than 35°.

Herein, in this context, the term "projection angle A" is meant to refer to the angle viewable from the orientation of FIG. 3, i.e., toward an upstream surface of the precleaner vanes 43. It is meant to be a reference to the angle as projected in such a plane, as viewed FIG. 3.

The issue of whether the vanes 43 overlap, or provide an angle A of the type defined, is an issue of design parameters relating, for example, to: (a) an overall restriction level acceptable for operation of the precleaner 1 in use; (b) the efficiency of separation desired, for the air cleaner, under some defined operation parameters; and, (c) ease of construction. In general, the provision of a space corresponding to angle A, provides for less restriction, than in its absence. However, a variety of configurations are possible.

The presence or absence of a space corresponding to projection angle A, FIG. 5, and the size of the space in use, is a matter of design choice, depending upon the particular system involved in design parameters desired For any specific application, it can be selected, and indeed even be optimized, using such software tools as FLUENT.

Referring to FIG. 7, the rate of air flow in the direction of arrow 3a increases, the amount of restriction posed by the vane assembly 51 potentially increases as well. The particular vane assembly 51 depicted, includes a vane configuration adjustment arrangement to allow for the adjustment in the angle across the air flow of one of more air deflection vanes 43, as air flow is increased.

For convenience, in FIG. 8 the downstream view of vane assembly 51 is depicted. In the view point of FIG. 8, air would be exiting vane arrangement 51 in the general direction of arrow 91. Of course the air would be in a swirling pattern.

Figure 10:
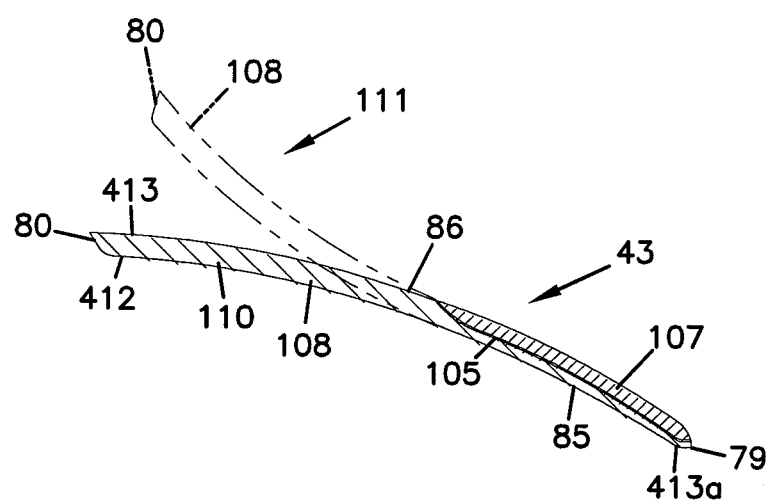
FIG. 10 is a view of the component shown in FIG. 9, with phantom lines indicating a second vane orientation.

Still referring to FIG. 10, the positions 110, 111 shown, are meant to exemplify principles of operation. The specific position taken by vane piece 108 will be a matter of design choice, based upon both efficiency of operation parameters and restriction parameters, desired for the two extreme positions. It is meant that it be understood that member 108 can flex as air flow increases, thus opening vane structure 30 to air flow there through, and offering lower restriction. Of course a price for this lower restriction, under high flow operating conditions, is less efficiency of operation for the precleaner 1.

IV. The Vane Configuration Adjustment Arrangement

In general, a change in configuration of an air deflection vane 43 to reduce the extent to which it is directed across air flow in the direction of arrow 3a, FIG. 7, will result in: (a)

reduction in efficiency of the precleaner; and, (b) reduction in restriction offered by the vane arrangement 30 to inlet air flow. It is a characteristic of preferred precleaners according to the present disclosure that a vane configuration adjustment arrangement is provided that allows for an automatic, designed, level of adjustment in the configuration of one or more selected vanes relative to inlet air flow, in response to anticipated air flow rate increase. This allows for design of a precleaner which is relatively efficient (as a separator) under lower (relative) air flow operating conditions and which offers less (relative to the absence of such an adjustment arrangement) increase in restriction to air flow, under relatively high air flow conditions. As an example, the particular vane angle adjustment arrangement depicted, was developed in response to a need for a precleaner efficiency of at least 50%, typically at least 60%, for example 65% at 350 cfm operation, with preferably no greater than 6" water restriction increase (from the 350 cfm restriction) at 900 cfm operation, within a space of limited dimensions, in particular one in which the axial length of the precleaner blades or vanes would need to be less than the vane outer size of the vane construction. In this context, efficiency is meant to be precleaner dust efficiency when measured by SAE Standard J726C. Indeed, the arrangement can be configured for a total restriction of the precleaner of <1" of water at 350 cfm and no more than 7" of water, at 900 cfm, while still achieving at least 60% efficiency when measured by SAE Standard J726C.

It is noted that efficiency of operation varies, depending upon the material being separated. It has been noticed, for example, that arrangements according to the disclosure herein can be configured as relatively efficient water separators, on the order of about 50%, often 70%, or larger, when measured according to SAE Standard J2554.

It is a characteristic of the preferred precleaner arrangement described herein, that the vane configuration adjustment arrangement is automatic. That is, it is designed for adjustment in vane configuration in direct response to selected air flow rate increases.

As indicated above, one or more of the air deflection vanes 43 can be constructed to be adjustable in configuration, according to the principles of the present disclosure. Whether one of the vanes 43 is constructed to offer this, more than one of the vanes, or all of the vanes, is a matter of choice. It is anticipated that in a typical application, all of the vanes 43 will be constructed to be adjustable in configuration, however there is no requirement of this in all practices of the principles disclosed herein. In general, any air deflection vane which is constructed to be adjustable in configuration, in response to air flow, can be termed herein to be an "adjustable air deflection vane" or by similar terminology.

Herein, the adjustable air deflection vanes are constructed, as indicated below, by providing at least a portion of the vane of a flexible, deflectable, material. Herein when it is said that the material is "deflectable" it is the method the material can distort or bend in configuration, in response to pressure there against. A preferred arrangement for accomplishing this, is indicated.

Attention is now directed to a specific air deflection vane 43 as an example of an adjustable air deflection vane, in particular vane 105, FIG. 5. The construction of vane 105 is shown in cross-section, in FIG. 9; FIG. 9 being taken along the cross-sectional line 9-9, FIGS. 5 and 11.

Referring to FIG. 9, vane 105 comprises at least two components: (a) a rigid structural piece 107; and, (b) a flexible member 108.

In FIGS. 5 and 9, vane 105 is depicted as it would appear under conditions of no air flow and also under a relatively low, flow rate, for preferred efficiency precleaner operation. In some instances herein, the configuration of vane 105, FIGS. 5 and 9, will be characterized as a "first" orientation, position or configuration. When the term "first" orientation, position or configuration is used, reference is generally meant to the configuration which the corresponding vane, in this instance vane 105, takes when there is no air flow through the precleaner 1.

Attention is now directed to FIG. 10. In FIG. 10, at 110, flexible member 108 is also shown under a normal low flow rate or no flow rate position; in a first orientation or position. Position 111, shown in phantom, depicts a high flow rate position for flexible member 108. That is, the material of the flexible member 108 is selected such that end 80 can bend (distort or deflect) in the direction of air flow, as air flow is increased. As an example, the vane 105 can be constructed such that position 110 generally indicates the flexible member 108 configuration under an air flow rate of 350 cfm, or less and, such that position 111 generally indicates the configuration taken by flexible member 108 under a flow rate of 900 cfm.

Of course positions between the extremes reflected at 110, 111, FIG. 10, would occur depending on the particular flow rate between the lowest and highest flow rates involved, for the example given.

In the terminology used herein, referring to FIG. 10, configuration 110 would be a first orientation, position or configuration for vane 105, and, configuration 111 would be a second orientation, position or configuration, for vane 105.

FIG. 9 depicts a particular convenient construction for the vane 105. For the example shown, rigid structure 107 is positioned adjacent upstream edge 79 of the vane 105. Thus, rigid structure 107 has an upstream edge 107a and a downstream edge 107b. At the downstream edge 107b, rigid structure 107 includes a beveled edge 107c, to advantage. The beveling is from tip 107b toward upstream side 107d of structure 107.

In the context of the present disclosure, the term "upstream" when used in connection with characterizations of the vanes 43 or their precleaner assembly 1, is meant to refer to a portion of the referenced structure which is most toward the inlet end 40 of the precleaner 1. Analogously, when the term "downstream" is used in reference to any portion of vanes 43, vane structure 30 or precleaner 1, reference is meant to the portion furthest from upstream edge 40, or closest to downstream edge 38b.

Attention is now directed to FIG. 5. For the particular embodiment shown, the vane structure 30 comprises seven adjustable air deflection vanes 43. For the preferred arrangement, preferably each vane 43 has a two piece construction including a rigid structural piece analogous to rigid structural piece 107 and a flexible, bendable, member or portion analogous to flexible member 108. The specific shape of each rigid structural piece and each flexible member may differ from the precise shape of piece 107 and member 108, for vane 105. However the general structure, with a rigid structural section and a flexible member will be analogous.

Attention is now directed to FIG. 8. FIG. 8 is a view of vane structure 30 toward a downstream side 115. Vane 105 is viewable, then, from the backside (or downstream side) relative to the view point of FIG. 7. Rigid structural piece 107 and flexible member 108 are thus viewable. Indeed the rigid structural pieces 116 for each of the vanes 43 can be viewed.

In addition, referring to FIG. 8, a portion of the flexible member 117 of each vane 43 can be viewed.

Still referring to the vane structure 30 depicted in FIG. 8, in general the side wall 60, mounting flange 61, center piece 65 and rigid structural pieces 116, can be molded integrally as a one piece construction from a plastic material such as polypropylene.

In each case, typically the flexible members 117 will comprise pieces of thermoplastic elastomer, for example Santoprene. Typically they will be chosen from materials having a durometer of 45-85 Shore A, typically 50-6 Shore A, inclusive.

Although a variety of methods of construction can be used, the convenient one would be to use a two shot molding technique. According to such a technique, typically the polypropylene plastic resin would first be injected into the mold to eventually form all rigid structure, including rigid portions 107. Then, a top portion of the mold could be switched to provide for a second shot molding by injecting the plastic elastomer into the mold, for the flexible vane portions 108. This would cause a binding of flexible portions to the rigid portions of the structure, without an extra step or use of adhesive.

Figure 11:
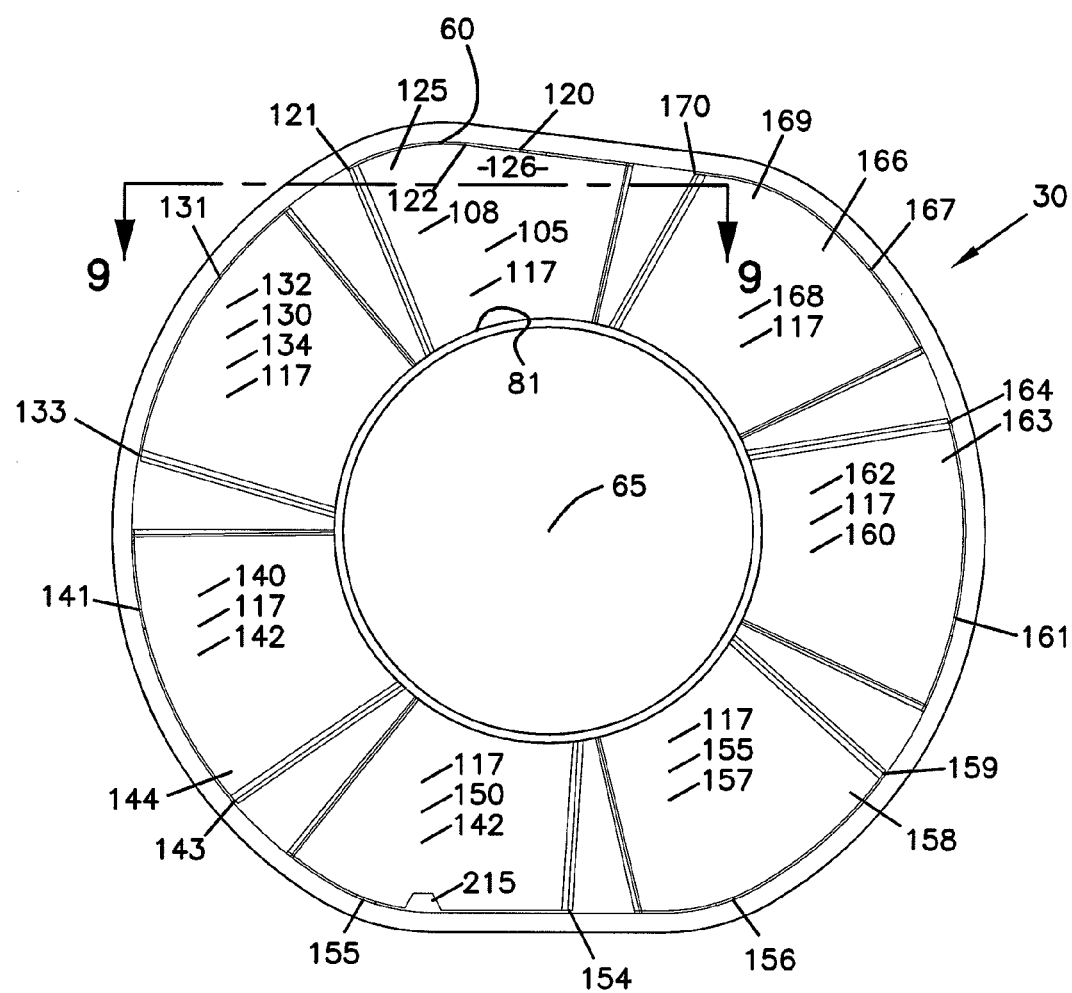
FIG. 11 is a front view of the component depicted in FIGS. 7 and 8.
Figure 12:
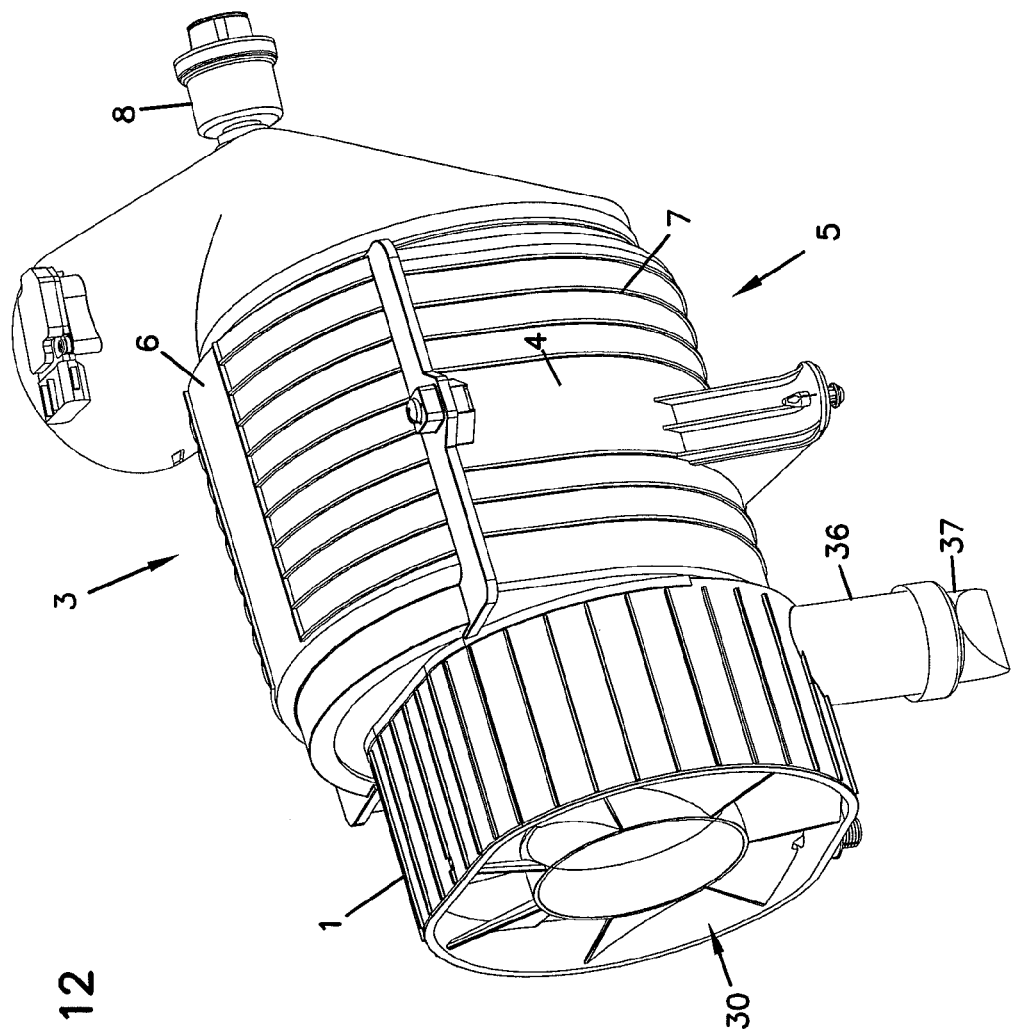
FIG. 12 is a perspective view of the air cleaner arrangement depicted in FIG. 2, the perspective view showing a portion of the inlet end.

Attention is now directed to FIG. 11, which is an enlarged plan view of vane structure 30. It is important that a portion of each flexible member 117 be left in a position such that it can bend, in general accord with FIG. 10, under increased flow. Referring to FIG. 30, and specifically to vane 105, point 120 shows the most downstream edge of the rigid structural member, behind flexible member 108. This downstream edge corresponds to edge 107b, FIG. 9. From this location, to point 121, a small gap 122 is provided between piece 108 and side wall 60. A gap on the order of about 0.1-0.8 mm., will be sufficient, although larger ones could be used in some systems. This means that portion 125 of flexible member 108 is a flexible, outside or perimeter, downstream ear that can bend away from the viewer in FIG. 11, under increased air pressure against surface 126.

Preferably the flexible material used for the flexible member 117 is chosen with a memory (or memory bias) such that, as air flow rate is reduced, or air flow rate is stopped, it will tend to return to its first orientation position or configuration. The preferred material characterized above, provides for this characteristic.

For the vane structure 30 depicted in FIG. 11, each vane has a similar construction. Thus, referring to vane 130, the corresponding rigid structural member (out of view) terminates at a downstream edge 131. The flexible member 132, is not secured to rim 30 in extension between point 131 and edge 133. Thus, flexible member 132 can bend in region 134, away from the viewer (i.e., downstream) like an outside ear, at this location. For vane 140, point 141 indicates the downstream end of the corresponding rigid structural member. The flexible member 142, then, can bend, away from the viewer, like an outside ear at a location between point 141 and point 143, i.e., in region 144 since it is not secured to rim 60 in this location.

Referring to vane 150, the downstream most location for the rigid structural member is indicated at 151, and thus flexible member 152 can bend like an ear in region 153 between point 151 and point 154, due to the presence of a gap between flexible member 152 and rim 60, along this location.

For vane 155 the downstream most point for the rigid structural member is located at 156, and thus the flexible member 157 can bend like an ear, in region 158 away from the viewer, between point 156 and point 159.

For vane 160, the downstream most point of the rigid structural member is indicated at 161, and thus flexible member 162 can bend like an ear in region 163, away from the viewer, between point 161 and point 164, since a gap is provided between the flexible member 162 and the rim 60, along this location. Finally attention is directed to vane 166. The point at downstream position for the rigid structural member is indicated at 167. The flexible member 168 can flex or bend like an ear, in region 169, away from the viewer, between point 167 and point 170, since member 168 is not secured to rim 60 along this extension.

Along the inside edges, 81, the flexible members are secured to the hub 65.

From the above description, it will be understood that a precleaner that allows for adjustment in vane configuration, under increased air flow, has been provided. Before the air flow is initiated, the vanes adopt a first position, configuration or orientation. As air flow is passed through the vanes, as long as the flexible material chosen for the flexible portion of the vanes is sufficiently strong, to resist deformation under the flow pressure of the incoming air, the vanes will maintain their first orientation. The first orientation and stiffness of the flexible member will be chosen, to provide for a preferred level of precleaner efficiency at selected flow rates.

The material from which the flexible portions of the vanes are made will also be chosen, such that the air flow increases beyond a selected point, the flexible portions will tend to bend downstream, opening the precleaner air flow for less increase in restriction but also with less efficiency of precleaner performance. When the air flow again reduces, the memory of the flexible material will return the flexible material toward the first orientation, thus increasing the efficiency of the precleaner.

It has been found, with an example of a precleaner rated for a first efficiency at least 200 cfm, for example 350 cfm, and using a configuration analogous to that described, an increase in flow rate of at least 400 cfm (for example to a flow rate total of 900 cfm) resulted in only an increase in restriction (relative to flow at 350 cfm) offered by the precleaner, of no more than 6 inches of water, and indeed an example in which the increase was no more than 5 inches of water, was observed. With such a construction, a precleaner rated for an efficiency of at least 60% and indeed an efficiency of at least 65% was achievable, at 350 cfm; efficiency in this context being as measured according to SAE J726C.

Efficiency for water separation was found to be at least 75% when measured according to SAE J2554.

V. Other General Features of the Depicted Air Cleaner Assembly 3

The vane angle adjustment arrangement discussed in Section IV above, can be applied in a variety of precleaners. Further, the precleaners can be used with a variety of air cleaners. In FIGS. 3 and 4, a particular air cleaner arrangement is depicted, as an example. Attention is directed to FIG. 4, with respect to various air cleaner features.

As indicated above, reference numeral 11 indicates the primary filter element which, periodically, is removed and refurbished or replaced, i.e., serviced.

The particular filter element 11 depicted, utilizes z-filter media. Z-filter media is generally configured for straight through flow from a most upstream face 195 to a most downstream 196. The media typically comprises an arrangement of corrugated media secured to flat media, and then stacked or coiled (sometimes with a center core, not shown) to form a plurality of flutes. One set of flutes (inlet flutes) is open at the upstream face 195 and closed at the downstream face 196; and, a second set of flutes (outlet flutes) is closed at the upstream face 195 and open at the downstream face 196. The air to be filtered can enter the inlet set of flutes, but in order to exit the element 11 it must pass through the media and into the outlet flutes. Examples of such z-filter arrangements are described for example in U.S. Pat. Nos. 6,190,432; 6,350,291; 6,179,890; 6,235,195; 5,820,646; 5,772,883; and, 5,902,364; incorporated herein by reference.

Figure 13:
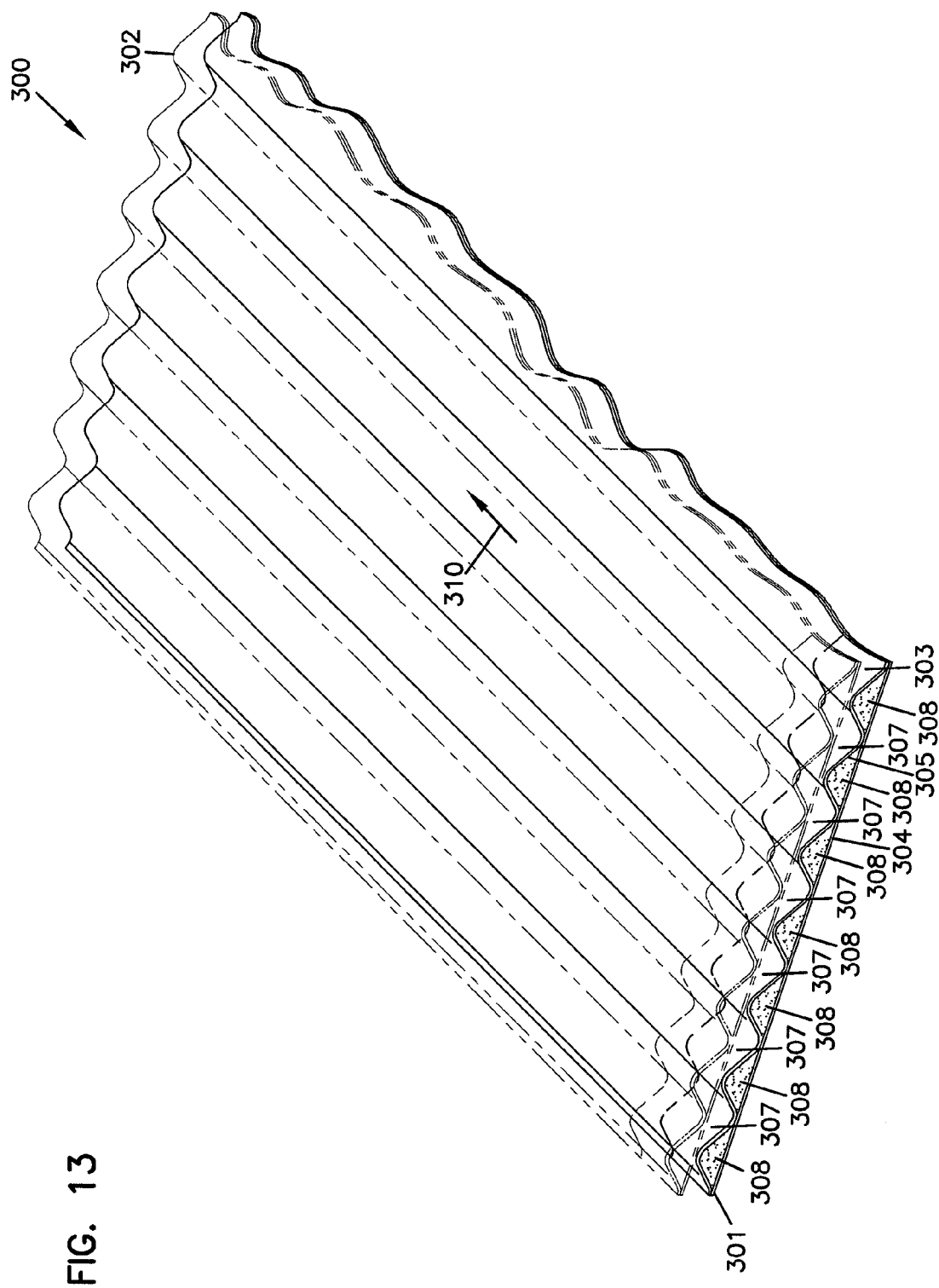
FIG. 13 is an enlarged, fragmentary, view of z-filter media useable in the air cleaner assembly of FIG. 4.

A fragmentary schematic view of useable z-filter media is indicated at FIG. 13, at 300. Referring to FIG. 13, media 300 has an upstream edge 301 and a downstream edge 302, corresponding to faces 195 and 196, FIG. 4.

The media 300 comprises a corrugated piece 303 secured to a facing sheet 304, to define flutes 305 therebetween. The media is coiled around itself, to create multiple layers.

As a result, the media is formed inlet flutes 307 and exit flutes 308. The exit flutes 308 are sealed closed, at or adjacent the upstream edge 301. Analogously, the inlet flutes 307 would be sealed closed adjacent downstream edge 302. General indication of air flow direction in use, is provided at arrow 310.

The flutes can be provided with a variety of individual shapes, and which a variety of types of closures at the opposite ends 301, 302. The material 300 depicted in FIG. 3, is meant to generally indicate a typical example of z-filter media.

Of course precleaners according to the present disclosure can be applied in constructions which utilize primary filter elements involving media other than z-filter media. However, the particular precleaner depicted is conveniently applied with a z-filter, because with a z-filter arrangement the air flow does not make a 90° turn in flow, while from the inlet flow direction to the outlet flow direction, for the element. In some instances, z-filter media is provided with, opposite, planar upstream or downstream faces, analogous to faces 195, 196. However alternate configurations are possible, in which one of the other faces is step or conical, or is slanted. Of course precleaners according to the present characterization can be used when air cleaners are adapted to receive filter elements with such configurations.

Z-filter media constructions can also be arranged in a variety of perimeter shapes. For example they can be coiled into shapes having a circular outer perimeter, or can be coiled into shapes having a race track perimeter comprising two curved sections separated by two straight sections. A circular shape construction is shown for example in U.S. Pat. No. 6,350,291 at FIG. 1. A race track shape arrangement is shown for example in U.S. Pat. No. 6,350,291 at FIG. 10. Of course still other configurations are possible.

The preferred features of the precleaner 1 characterized above, can be adapted for application with a variety of air cleaner housings having media constructions, z-filter or otherwise, shaped in a variety of perimeter shapes.

Filter constructions can be sealed to housings in a variety of manners. For z-filters, typically a gasket material is secured at some location to the z-filter construction, either directly or indirectly. By "directly" in this context, it is meant that the seal is secured directly to the media. By indirectly it is meant that the gasket material secured to some structure which is itself secured to the media.

The particular arrangement depicted in FIG. 4, shows an example. In this instance, a seal at 198 is secured to a framework 199 which is itself secured to the media 200.

This type of seal arrangement, which uses an outwardly directed radial seal, is described for example in U.S. Pat. No. 6,350,291, incorporated herein by reference. Alternate seals can be used, if desired.

The particular air cleaner housing 4 depicted in FIG. 7, is constructed for "side load" or "side service." That is, element 11 is inserted (or dismounted) through a side of housing 5, by passage through an opening made available by removal of access cover 6. The element 11 is provided with an end piece 205, at upstream end 195, which is positioned engage a cam or ramp structure, to drive the element in the direction of arrow 207, and thus into sealing engagement, when installed. Side mounting arrangements are described, for example, in PCT application number US/03/14350, filed May 8, 2003 in which claimed priority to U.S. provisional application 60/379,824 which was filed on May 9, 2002 entitled "Filter Arrangements, Side-Entry Housings; and Methods," is made. The referenced application is incorporated herein by reference.

At 214, FIG. 4, a connector is depicted attached to the precleaner assembly 1. The connector 214 allows for attachment to various vehicle framework or similar structure. Referring to FIG. 11, vane 142 includes a notch 215 therein, to accommodate the connector 214.

Referring to FIG. 1, the precleaner 1 can be separately assembled from the remainder of the air cleaner housing, and can be secured to the air cleaner housing by mounting projections 220. A friction fit or snap-fitted arrangement can be used. Alternatively, an adhesive or sonic weld can be used. If desired, a gasket or seal ring can be provided, between the precleaner 1 and main air cleaner housing 4. However, it is not anticipated that, typically, a seal at this location will be required.

VI. Some Dimensions of the Embodiment Depicted in the Figures

As should be apparent, the principles described herein can be applied in a wide variety of air cleaner arrangements. The particular air cleaner depicted, is configured for installation under the hood of a truck. For this system, the side load access from the top, provides for convenient servicing once the assembly 3 is installed. The precleaner, of course is not normally serviced.

The dimensions depicted in the following section, then, are meant to indicate dimensions of some workable arrangements. A variety of alternate dimensions can be used.

The axial length of the precleaner would be about 100 mm., for example 101.2 mm.; dimension X of the perimeter dimension of the vanes 43, would be about 190 mm., for example 192.8 mm.; referring to FIG. 4, the projected axial length of the main air cleaner 4 between points 400 and 401 would be about 196 mm.; and, the projected axial distance between points 401 and 402 would be about 145 mm., for example 145.5 mm.

Referring to FIG. 7, the projected axial distance between points 405, 406 would be about 27 mm., for example 27.2 mm., with the rim 61 being less than 2 mm., thick, for example about 1.8 mm. thick.

Referring to FIG. 9, the thickness of region 110, between points 412 and 413, would be less than 1 mm., for example about 0.7 mm. The thickness in region 413, of the flexible material of axial vane piece 108, would be about 1 mm.

Flexible member 108 includes two sections: (a) an upstream section 108a which, in the example, extends to overlap with rigid structural piece 107 on an upstream side; and, a downstream bendable section 108b, which extends from beveled section tip 107b of rigid piece 107 to downstream edge 80, of vane 105. At end 80, the particular section 108b depicted has a beveled end 108c. For the example depicted, beveled section 108c is beveled from the downstream tip 108d toward upstream side 85 of piece 108.

It is noted that when the flexible member 108 bends, it tends to bend over or around the downstream most edge 116a of each rigid structural piece 107, FIG. 8.

In a typical application to a small truck (class 2A or 2B), the overall dimensions to the precleaner would be about 4 inches to 20 inches in an outside dimension, approximating diameter is not round; and about 2 inches to 10 inches in length; typically about 6 inches to 12 inches in approximate outside diameter by about 3 inches to 6 inches in length.

VII. Further Discussion of the Precleaner Arrangement

Now that a specific example has been provided, general characteristics of preferred precleaner arrangements according to the present disclosure can be described. In general the precleaner arrangement can be constructed for separating a portion of entrained material, such as dust or moisture, from air entering an air stream of an air cleaner. The precleaner arrangement would include a vane structure arrangement having at least a first adjustable air deflection vane. The first adjustable air deflection vane would have a flexible portion deflectable from a first orientation or position toward, and in some instances to, a second orientation or position. The flexible portion would have a memory bias toward the first orientation. The flexible portion would be configured to deflect toward the second orientation or position, in response to sufficient air flow increase through the precleaner arrangement in use. In this context, the term "memory bias" is meant to refer to a characteristic of the flexible material which tends to cause it to return to its rest or first orientation.

Of course in a typical arrangement, the vane structure would include a plurality of adjustable air deflection vanes positioned around a central hub. Preferably a single hub, with a set of vanes therearound, would be in the vane structure arrangement. Of course each adjustable air deflection vane would be analogous to the first adjustable air deflection vane, although variations and specific vane shape may be used to accommodate different shapes of vane structures. Vane structures having outer circular perimeters, or obround perimeters, or a variety of alternate shapes, are possible.

Typically and preferably each adjustable air deflection vane includes a flexible member and a rigid structural member.

Typically the vane structure arrangement includes at least three adjustable air deflection vanes, typically 5-15 such vanes.

In certain typical preferred arrangements, the vane structure has a first axial vane length X and a first vane perimeter size Y, with a precleaner being configured such that X is less than Y. Typically and preferably the precleaner is configured such as X is less than 0.7 times Y. Indeed it can be configured such that X is less than 0.3 Y.

Also typically the arrangement is constructed such that the perimeter length X is less than an axial length Z of the precleaner, typically less than 0.8 Z and preferably less than 0.6 Z.

In typical arrangements, the vanes are configured to have an outer, downstream, flexible ear portion not supported by any rigid structure, which can bend downstream to open up the precleaner to air flow, under increased air flow rates.

The precleaner arrangement can be adapted for incorporation in a variety of air cleaners, using a variety of types of elements. It is particularly well configured to be incorporated within an air cleaner that utilizes, as the primary air filter element, filter element having z-type media with an upstream face directed toward the vane arrangement of the precleaner.

What is claimed is:

1. A precleaner arrangement for separating a portion of entrained material from air flow air entering an engine air cleaner; the precleaner arrangement comprising:
   (a) a vane structure arrangement including at least a first, adjustable, air deflection vane;
       (i) the first, adjustable, air deflection vane having a flexible portion deflectable between a first orientation and a second orientation;
       (ii) the flexible portion having a memory bias toward the first orientation; and,
       (iii) the flexible portion being configured to deflect toward the second orientation, in response to a sufficient air flow rate increase through the precleaner arrangement, in use.

2. A precleaner arrangement according to claim 1 wherein:
   (a) the vane structure arrangement comprises a plurality of adjustable air deflection vanes positioned around a central hub;
       (i) each adjustable air deflection vane having a flexible portion deflectable between a first orientation and a second orientation;
       (ii) each flexible portion having a memory bias toward a first orientation; and,
       (iii) each flexible portion being configured to deflect toward the second orientation in response to a sufficient air flow rate increase through the precleaner arrangement, in use.

3. A precleaner arrangement according to claim 2 wherein:
   (a) each adjustable air deflection vane comprises:
       (i) a flexible member; and,
       (ii) a rigid structural member.

4. A precleaner arrangement according to claim 3 wherein:
   (a) the vane structure arrangement includes at least three adjustable air deflection vanes.

5. A precleaner arrangement according to claim 4 wherein:
   (a) the vane structure has a first axial total vane length X and a first vane perimeter size Y;
   (b) the precleaner being configured such X<Y.

6. A precleaner arrangement according to claim 5 wherein:
   X<0.7Y.

7. A precleaner arrangement according to claim 6 wherein:
   X<0.3Y.

8. A precleaner arrangement according to claim 4 wherein:
   (a) the vane structure includes a perimeter rim:
       (i) each adjustable air deflection vane being secured in extension between the central hub and the perimeter rim; and
       (ii) a perimeter edge portion of each flexible portion being spaced from the perimeter rim, to define a flexible, downstream, outer ear in the associated flexible portion.

9. A precleaner arrangement according to claim 8 wherein:
   (a) each adjustable air deflection vane has: a lead, upstream, edge; and, a tail, downstream, edge; and
   (b) the flexible member has a concave upstream surface in extension between the lead edge and the tail edge, when in the first orientation.

10. A precleaner arrangement according to claim 9 having:
   (a) a projection angle A between the lead upstream edge of each adjustable air deflection vane and a tail edge of a next adjacent air deflection vane of at least 17°.

11. A precleaner arrangement according to claim 8 wherein:
   (a) the vane structure arrangement is secured to a perimeter housing structure having a dust drop tube.

12. An air cleaner comprising:
   (a) a precleaner arrangement comprising a vane structure arrangement including a plurality of adjustable, air deflection vanes;
      (i) each adjustable air deflection vane having:
         (A) a flexible member; and,
         (B) a rigid structural member;
      (ii) each flexible member being deflectable between a first orientation and a second orientation;
      (iii) each flexible member having a memory bias toward the first orientation; and
      (iv) the flexible member being configured to deflect toward the second orientation, in response to a sufficient air flow rate increase through the precleaner arrangement, in use; and
   (b) a main air cleaner positioned to receive air from the precleaner arrangement;
      (i) the main air cleaner having a serviceable air filter element therein.

13. An air cleaner arrangement according to claim 12 wherein:
   (a) the serviceable air filter element comprises z-filter media.

* * * * *